US006678673B1

(12) United States Patent
Eves et al.

(10) Patent No.: US 6,678,673 B1
(45) Date of Patent: Jan. 13, 2004

(54) SYSTEM AND METHOD FOR PROVIDING APPROPRIATE HYPERLINK BASED ON IDENTIFIED KEYWORDS FROM TEXT MESSAGES SENT BETWEEN USERS

(75) Inventors: David A. Eves, Crawley (GB); Richard J. Allen, Redhill (GB); Allan R. Timms, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/256,462

(22) Filed: Feb. 23, 1999

(30) Foreign Application Priority Data

Feb. 24, 1998 (GB) ............................................. 9803819

(51) Int. Cl.⁷ ............................................. G06F 17/30
(52) U.S. Cl. .......................................... 707/3; 345/758
(58) Field of Search ........................... 707/101, 3, 505, 707/4, 6, 104; 345/758; 705/1; 704/9; 709/245

(56) References Cited

U.S. PATENT DOCUMENTS

| | | | | |
|---|---|---|---|---|
| 5,704,060 A | | 12/1997 | Del Monte ................. | 395/600 |
| 5,793,365 A | * | 8/1998 | Tang et al. .................. | 345/758 |
| 5,799,268 A | * | 8/1998 | Boguraev ..................... | 704/9 |
| 5,802,493 A | * | 9/1998 | Sheflott et al. .............. | 705/1 |
| 5,864,848 A | * | 1/1999 | Horvitz et al. ............... | 707/6 |
| 5,978,799 A | * | 11/1999 | Hirsch .......................... | 707/4 |
| 6,061,738 A | * | 5/2000 | Osaku et al. ................ | 709/245 |
| 6,078,917 A | * | 6/2000 | Paulsen, Jr. et al. ......... | 707/6 |
| 6,085,201 A | * | 7/2000 | Tso .............................. | 707/505 |
| 6,148,289 A | * | 11/2000 | Virdy ........................... | 705/1 |
| 6,182,065 B1 | * | 1/2001 | Yeomans ...................... | 707/3 |
| 6,278,993 B1 | * | 8/2001 | Kumar et al. ................ | 707/3 |
| 6,282,548 B1 | * | 8/2001 | Burner et al. ................ | 707/104 |
| 6,292,802 B1 | * | 9/2001 | Kessenich et al. ........... | 707/101 |
| 6,430,602 B1 | * | 8/2002 | Kay et al. .................... | 709/206 |

FOREIGN PATENT DOCUMENTS

| | | | |
|---|---|---|---|
| EP | 0732660 | 3/1996 | ............ G06F/17/30 |
| EP | 0774722 | 5/1997 | ............ G06F/17/30 |
| EP | 0782318 | 7/1997 | ............ H04M/3/50 |
| GB | 2307619 | 5/1997 | ............ H04M/3/42 |
| WO | 9709681 | 3/1997 | ............ G06F/17/30 |

OTHER PUBLICATIONS

Bachenko et al, A Parser for Real–Time Speech Synthesis of Conversational Texts Apr. 1992, Proc. of ACL conf. Applied Natural Language Processing, 25–32.*
Eric Lippert, Dec. 08, 1998, pp. 1–2, "Javascript roleplaying", Google Search.*
"All the fun of the freeware", W. Gallagher, Information Week, No. 4, pp. 38, 30 1997; (Abstract); "Comic Chat", D. Kurlander, Microsoft Corp, Redmond WA, USA (Abstract);
"Building an integrated communication environment", P. Sousa, Networking in the Information Society, pp. 143/1—143/8, (Abstract).
"LogiMOD: Prolog technology for virtual worlds", K. De Bosschere, Proceedings of the Fourth International Conference on the Practical Application of Prolog, pp. 51–63 (Abstract).
"Creating hypermedia documents by doing: an alternative to authoring", C. Hand, The authoring and Application of Hypermedia–Based user–Interfaces (Digest No. 1995/202), pp. 3/1–3/3, (Abstract).

* cited by examiner

Primary Examiner—Zarni Maung
Assistant Examiner—Jungwon Chang
(74) Attorney, Agent, or Firm—Gregory L. Thorne

(57) ABSTRACT

In a computer communications system wherein a number of user stations are connected via a data network to a remote server hosting a chat-space where text messages may be exchanged, a parsing subsystem is provided in at least some of the user stations. The parsing subsystem identifys keywords in the exchange text messages and, using these as search terms sent to a further server hosting a search engine, obtains and makes available to the user auxiliary sources of data which may be of interest. In an alternative embodiment, the parser subsystem is held by the chatspace server and transmits the data from, or identifying, the auxiliary sources of data to the users on-line.

15 Claims, 7 Drawing Sheets

| CLASS | VALUE CHANGE | APPLIED TO: |
|---|---|---|
| PLU | + 1 | WORD |
| CAP | + 2 | WORD |
| VERB | + 2 | WORD |
| QUES | + 1 | EACH WORD IN MESSAGE |
| JUNK | - 2 | WORD |
| APOS | + 2 | WORD |
| INDI | - 2<br>+ 2 | WORD<br>FOLLOWING WORD |
| UNSU | + 1 | WORD |

FIG. 6

|  | The | cat | sat | on | the | mat |
|---|---|---|---|---|---|---|
| INIT | 0 | 0 | 0 | 0 | 0 | 0 |
| PLU | 0 | 0 | 0 | 0 | 0 | 0 |
| CAP | 2 | 0 | 0 | 0 | 0 | 0 |
| VERB | 2 | 0 | 0 | 0 | 0 | 0 |
| QUES | 2 | 0 | 0 | 0 | 0 | 0 |
| JUNK | 2 | 0 | 0 | 0 | 0 | 0 |
| APOS | 2 | 0 | 0 | 0 | 0 | 0 |
| INDI | *0 | 2 | 0 | *-2 | *0 | 2 |
| UNSU | 0 | 3 | 1 | -2 | 0 | 3 |
| FPASS | 0 | 3 | 2 | 0 | 0 | 3 |
| >= 2 | x | ✓ | ✓ | x | x | ✓ |

FIG. 7

SYSTEM AND METHOD FOR PROVIDING APPROPRIATE HYPERLINK BASED ON IDENTIFIED KEYWORDS FROM TEXT MESSAGES SENT BETWEEN USERS

BACKGROUND OF THE INVENTION

The present invention relates to user access systems and service provider host systems for data and service networks, particularly but not exclusively for use with the Internet/World Wide Web, and to communications between users when on-line.

Recent years have seen a rapid increase in the amount of data available to a user via data network coupling to a remote server, with cheap browser packages for home personal computer (PC) users continuing to increase the number of people on-line. A number of examples of network access and server systems, whether for the Internet or on a smaller local area network (LAN), are described in the introduction to EP-A-0 732 660 (Kambayashi et al/Toshiba). In the systems described, a number of user-operated "client systems" (for example home users) are enabled to access, via network, data stored by a server. As noted in EP-A-0 732 660, person to person communications systems such as telephone, electronic mail (e-mail), network talk and Internet chat spaces are well known, but these have traditionally existed separately from networked access systems with delays being introduced as the user switches between them as required. In order to reduce these delays, the system of EP-A-0 732 660 provides the data holding server with a store of user data (e.g. photograph, telephone number and e-mail address) which data is matched to a user logging on via a client station of the system. As a user navigates a particular area of the data held by the server, the server makes available to them some of the personal data of other users currently navigating the same area, such as respective screen icons comprising the other users photographs. By selecting one of these icons, the user has a communications channel (whether telephone, e-mail etc.) automatically set up with the identified user without having to break off navigation for any great length of time.

Whilst the above-described system reduces discontinuities in establishing communications whilst navigating stored data, the present applicants have recognised the need for a means to handle the converse problem, namely the avoidance of breaks in an established communications session to undertake stored data navigation.

SUMMARY OF THE INVENTION

It is therefore an object of the present invention to provide a means by which a user may have made available to him/her relevant information to accompany a communications session with another user without requiring conspicuous action on the part of either user and without unnecessary interruption of the communications session.

In accordance with a first aspect of the present invention there is provided a message parsing apparatus for use in a network communications system, said apparatus comprising: an input to receive text messages sent from a first communications device of the system to another; a parser subsystem coupled to receive said text messages, and including processing means arranged to process the received text in accordance with a predetermined processing strategy to identify one or more keywords therein; and a search subsystem coupled with the parser subsystem and arranged to receive the or each selected keyword, to selectively transmit one or more such keywords via said network to a search engine coupled with the network, to receive results from the search engine, and to output them to a user of the system. By the use of the parser subsystem to identify keywords during, for example, a web chat-space communications session, ancillary information of interest and/or relevance to one or more of the users is called up and may be made available automatically without requiring specific actions of the user, such as having to temporarily disrupt communications with another user in order to carry out a data search.

The parser subsystem suitably further comprises a first memory into which the words of a received text message may be loaded, each with a respective initial value, which values may then be subsequently modified during processing by the processing means, with the parser subsystem further being configured, at the conclusion of processing, to identify those stored words having an associated value exceeding a predetermined threshold and output said words as keywords to said search subsystem. The parser subsystem is preferably arranged to accumulate in such a storage device keywords from successive messages, and may be arranged to reduce the associated value of all stored keywords prior to, or whilst, identifying keywords and their respective associated values in a newly received message.

The search subsystem is suitably configured to select, for transmission to the search engine, those stored keywords meeting a selection criteria including at least partially the respective associated values. The first memory is suitably a non-volatile storage device and, at the start of a message communication session, the associated values for any stored keywords from a previous session may be halved, such that they are unlikely to be searched if the general topic of the communications session differs from that of the previous session, but will quickly gain sufficient value to trigger a search if the topics are the same.

The apparatus may further comprise user feedback means coupled to supply a feedback signal to said parser subsystem indicative of user response to received and output results from the search engine, with the parser subsystem being configured to adjust the stored keyword associated values in dependence on said feedback signal. Alternatively, this feedback means may select text strings from the received results and parse these in the same manner as user text messages to identify useful further keywords related to those already searched.

The present invention also provides a data network browser and a network server configured as a chat space provider, each incorporating the above described message parsing apparatus. Further features of these devices are described hereinafter and recited in the attached claims to which reference should now be made and whose disclosure is incorporated herein by reference.

BRIEF DESCRIPTION OF THE DRAWINGS

Further features and advantages of the present invention will become apparent from reading of the following description of preferred embodiments of the present invention, given by way of example only and with reference to the accompanying drawings in which:

FIG. 6 is a table listing the different tests applied during the routine of FIG. 5 and their respective effects;

FIG. 7 is a table showing the result of sequential application of the tests of FIG. 6 to a sample phrase;

DETAILED DESCRIPTION OF THE PREFERRED EMBODIMENTS

Figure 1:
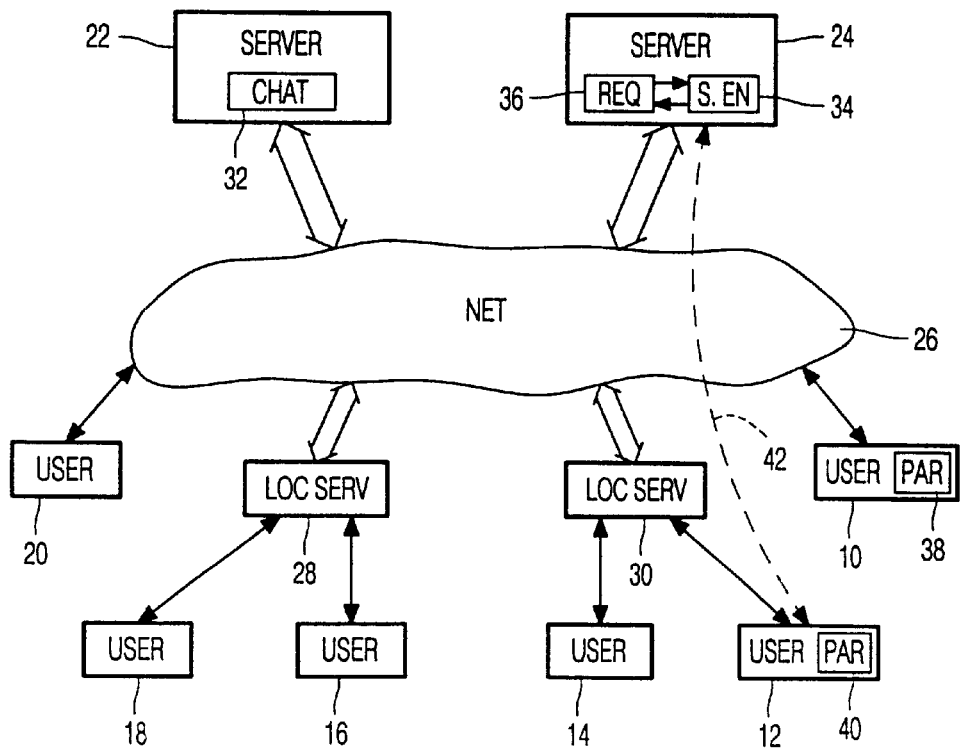
FIG. 1 is a block schematic diagram of a network communications system according to a first embodiment of the present invention.

A first embodiment of system configuration is illustrated in FIG. 1 and comprises a number of user computer systems 10, 12, 14, 16, 18, and 20, each of which has means to access a number of remote servers 22, 24, via a communications network 26: as shown, the user systems 10, 20, may couple with the network 26 directly or, as for user systems 12, 14, 16, 18, via one or more local servers 28, 30. In the following examples, an Internet/World-Wide Web system will be considered although it will be recognised that many of the aspects are applicable to smaller local-area network (LAN) systems, and even to the latest generation of mobile telephones and personal digital assistants (PDA's) having network access and browsing facilities.

The first 22 of the two servers shown maintains a chat space 32 to which users may log-on and exchange text messages. The second server 24 supports a network search service such as the PlanetSearch Internet information gateway developed by, and housed at, the Philips Multimedia Center in Palo Alto, USA. The network search service is based on a search engine 34, with associated request handling and processing stage 36. At least some of the user systems 10, 12 include a parser subsystem 38, 40 to be described in detail below. In operation, with a pair of user systems 12, 20 in communication via the chat-space 32, the parser subsection 40 of the system 12 identifies keywords in the text messages exchanged (or just in those messages sent by the user of system 12) and sends selected ones of those keywords in a string (or as separate entities) as search terms to the search engine 34, as indicated by dashed line 42. On receipt of the search results (typically in the form of one or more uniform resource locators—URL's—followed by a short segment of human readable content) the user system 12 presents them to the user in such a way as not to intrude on the chat space communication, for example at the periphery of a display on which the text messages are being shown.

The parsing may be applied to just a users own messages or it may additionally be applied to received messages and/or results downloaded by the user. In this last case, the users selection of a result from the search (e.g. calling up the URL) may be taken as indicative of the value of that result and, by passing selected text or the originally received human readable segment from the identified site back through the parser, the terms of the search may be refined and/or related information and topics may be discovered. Where communicating with a user system without the parser facility, a system so equipped is suitably configured to include the results in data sent to the other system. For complete compatibility, all stations would be configured to receive and handle such results when sent from another user rather than from the search engine 34.

Figure 2:
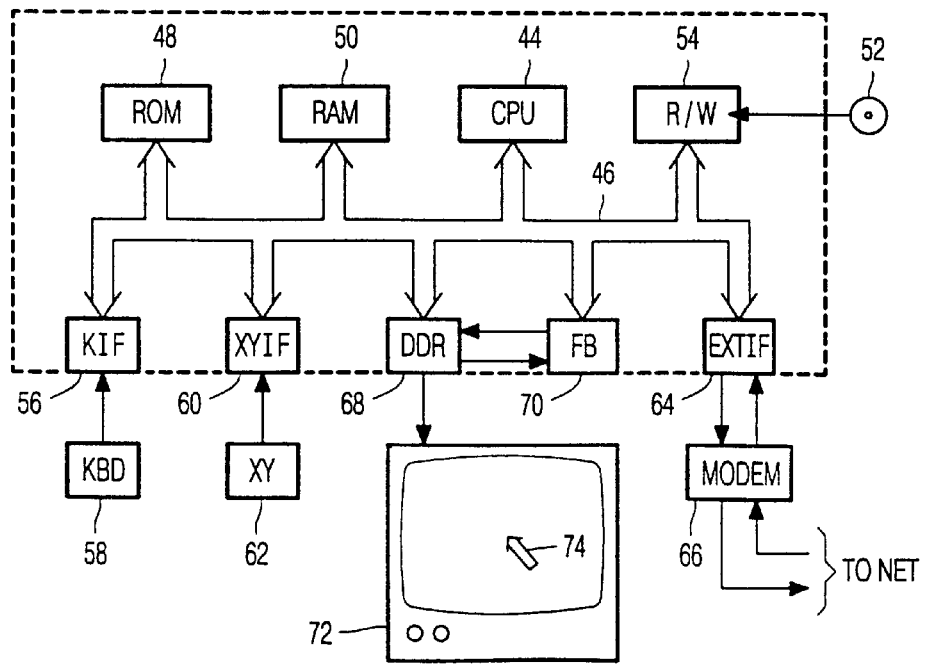
FIG. 2 is a block diagram of a personal computer system suitable for use as a user station in the system of FIG. 1.

A typical user system, in the form of a personal computer (PC) which may be configured to host the parser facility, is shown in FIG. 2. The system comprises a central processor (CPU) 44 linked via an address and data bus 46 to non-volatile read-only memory (ROM) 48 and random access memory (RAM) 50. A further source of, or destination for, stored data may suitably be magnetic or optical disc 52 accessed by a suitable read/write stage 54 controlled by the CPU via the bus 46. For connection of peripheral devices, a number of suitable interfaces are provided, again accessed via the bus 46. These interfaces include a keyboard interface 56 to receive signals (including input text messages) from a conventional keyboard or keypad 58; a pointer interface 60 to receive two-dimensional (or optionally three-dimensional for some applications) movement signals from an XY pointer device such as a mouse or trackball 62; and an external interface 64 linking the data and address bus 46 to a modem 66 or other data transfer means as determined by the form of network to be accessed. Also coupled with the bus are a display driver stage 68 and frame buffer 70, with the display driver calling up images assembled in the frame buffer for output to a display 72, such as a cathode-ray or liquid crystal display device. As illustrated, an on-screen cursor 74 is provided, with movement and selection being controlled via the mouse or trackball device 62.

Figure 3:
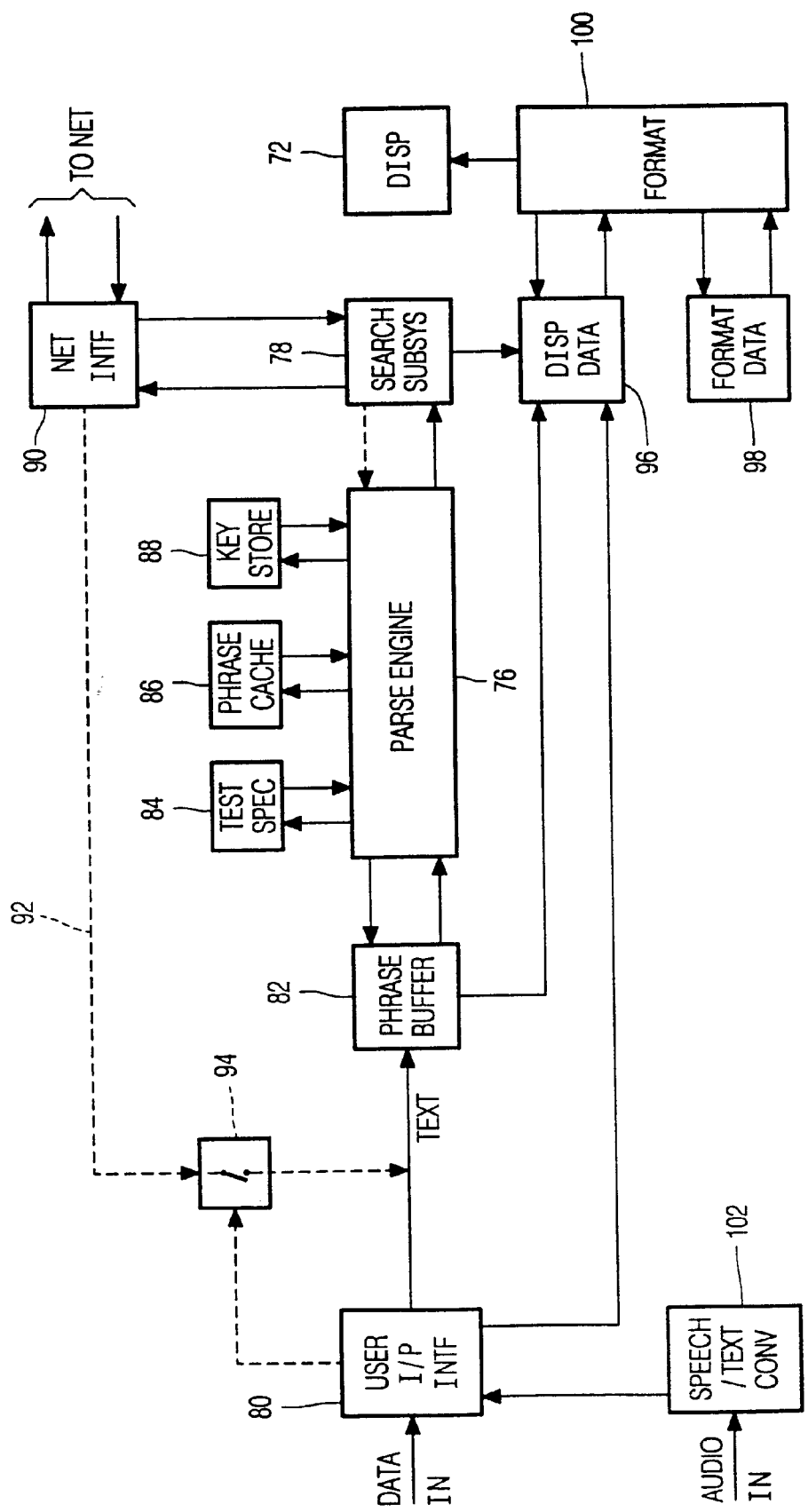
FIG. 3 is a schematic diagram of the functional components hosted by the computer system of FIG. 2.

The functional subsystems provided by the apparatus of FIG. 2 are shown in FIG. 3 and are based around a parsing engine 76 coupled with a search subsystem 78, both of which will be hosted by CPU 44. User input to the system is handled by interfacing stage 80 (interfaces 56, 60 under control of CPU 44) with the input text messages, referred to herein as 'phrases', being initially loaded into a phrase buffer 82 before processing by the parsing engine 76. Also coupled with the parsing engine are stores for the definition of the various parsing tests 84 applied by the engine 76, for accumulation of values 86 assigned to the separate words of a phrase as parsing is undertaken, and for keywords 88 selected by a current or preceding operation. The buffer 82 and stores 84, 86, 88 will be distributed in discrete areas of system ROM 48 and RAM 50 and, optionally, also on disk 52: in a preferred embodiment, for reasons which will become apparent, keyword store 88 is hosted in non-volatile memory.

The search subsystem 78 handles the sending of search terms and receipt of results via a network interface 90 (external interface 64 under control of CPU 44). As shown by dashed line 92, text strings in received information—whether messages from another user or data downloaded following search—may be loaded into the phrase buffer 82 for parsing in the same way as user-input messages. This facility may not always be required or desired and consequently is preferably made selectable by the user (by operation of switch 94) although this data will, regardless of whether or not it is parsed, be sent to the display subsystem for presentation to the user.

Data for display (text input from the user, search results, text from other users and cursor position/selection data) is accumulated in memory 96 coupled with the input interface 80, phrase buffer 82 and search subsystem 78. This data, together with formatting information from further store 98, is used by formatting stage 100 to generate a screen image, in which the data is presented to the user, for output on display 72.

In a modification or addition to the apparatus making up a user system, further input in the form of speech may be accommodated. In such a case, the audio is passed through a conventional speech/text converter stage 102 before passing to the input interface 80 where it is treated in the same way as directly input text messages.

The operation of the parser will now be described with reference to the functional diagram of FIG. 3, the flow charts of FIGS. 4 and 5, and the tables of FIGS. 6 and 7. This parser applies a sequence of tests to received phrases to identify keywords which may then be searched: it is a relatively simple arrangement dedicated to the handling of English language phrases, but has been found to give good results. The exact details of the parser are not an essential feature of the present invention and the skilled reader will understand that different and/or more complex tests may be employed: indeed, other tests will be required for parsing phrases in languages other than English and having different vocabularies and grammatical rules for sentence construction.

Figure 4:
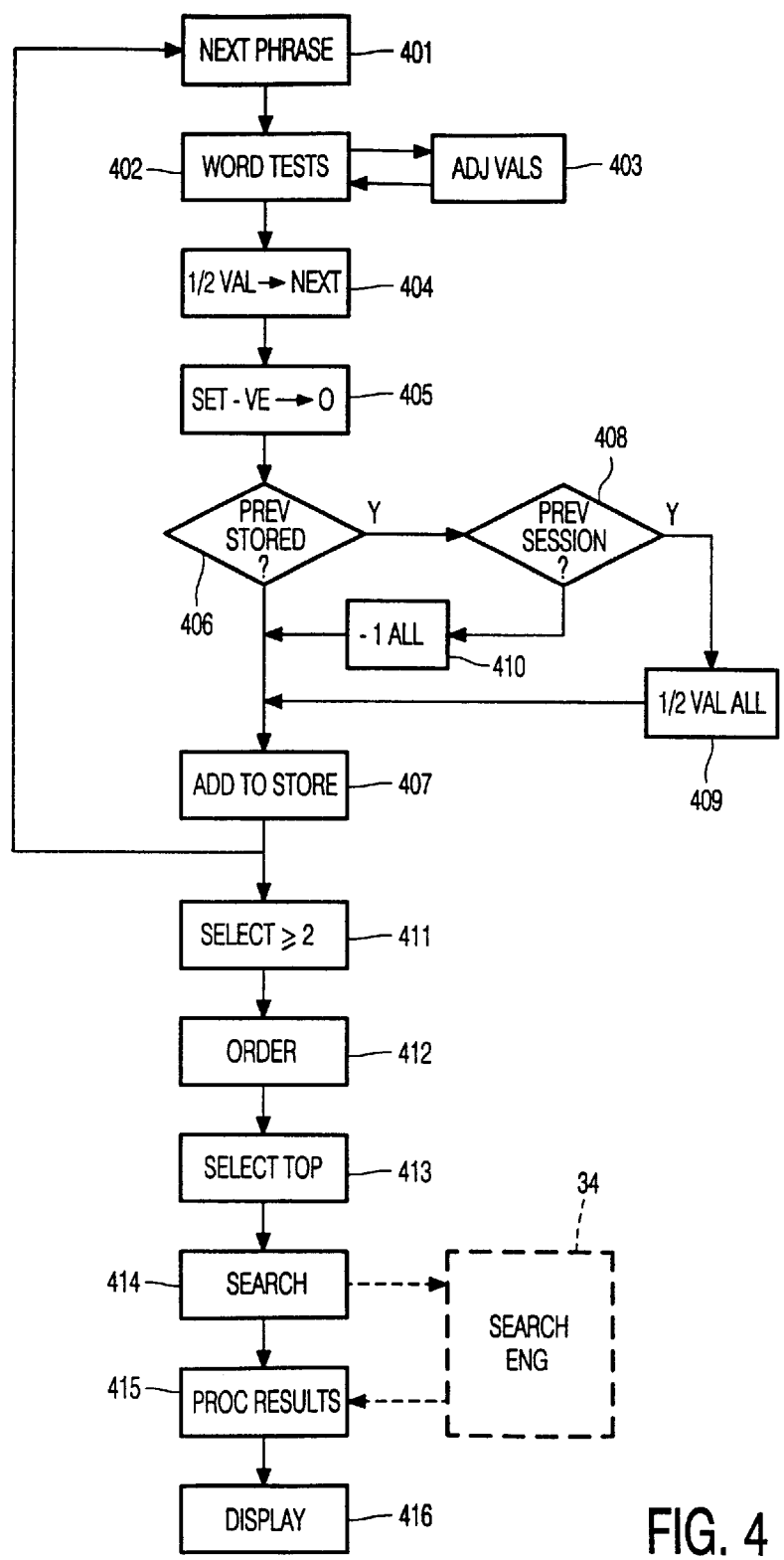
FIG. 4 is a flow chart illustrating the general operation of the parser component of FIG. 3.
Figure 5:
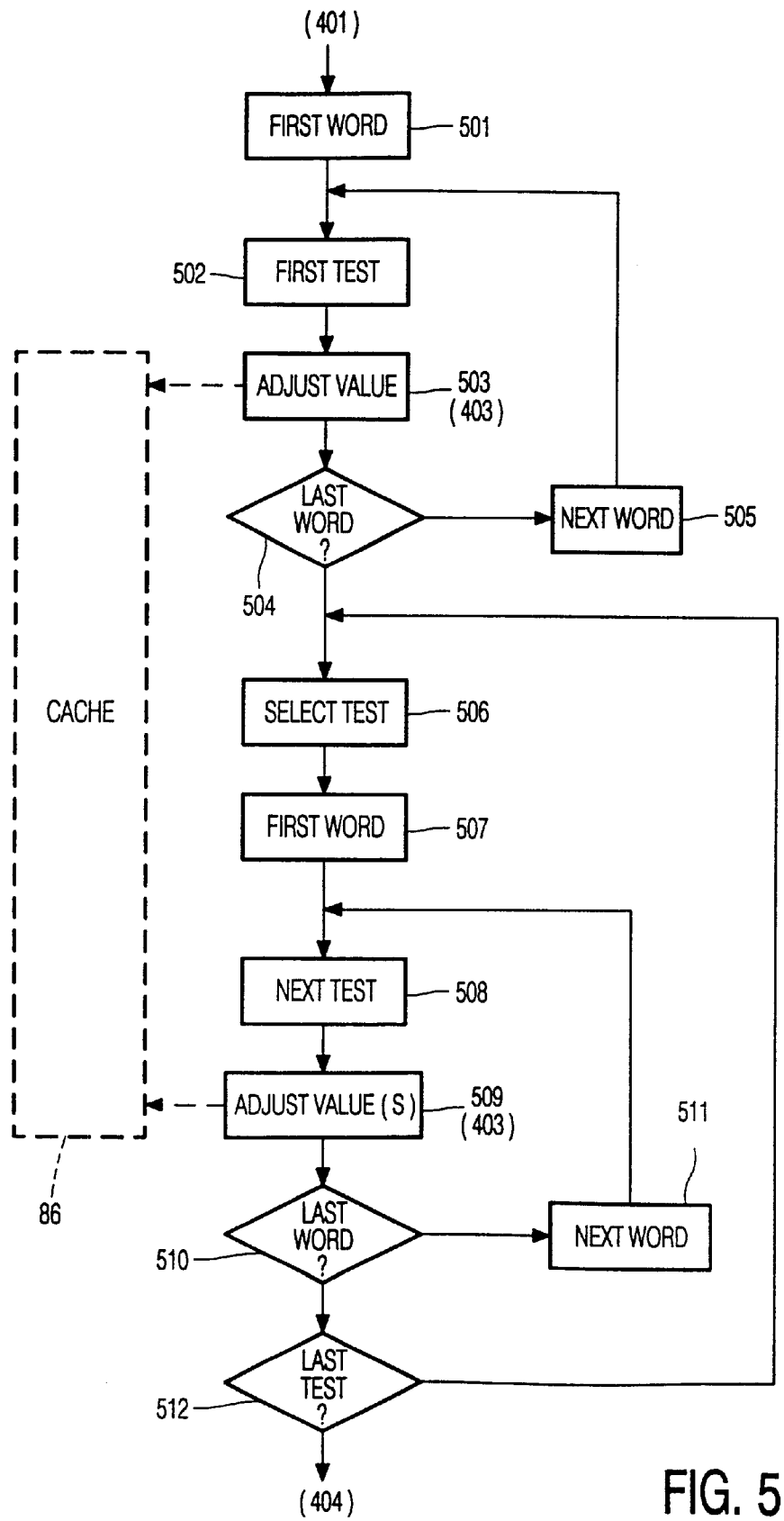
FIG. 5 is a flow chart illustrating in greater detail the word-test step of the chart of FIG. 4.

Referring initially to FIGS. 3 and 4, the procedure begins at step 401 with the selection of the next phrase from buffer 82 and its transfer to phrase cache 86 where each of the separate words has a respective associated value: on first loading, all words are given an associated value of zero.

The next step 402 involves carrying out a number of tests on the words of the phrase with corresponding adjustments 403 made to their stored associated values (in cache 86) in dependence on the test outcomes. The test procedure is shown in greater detail in FIG. 5 and commences with the selection at 501 of the first word (in written order) of the phrase, followed by the application 502 of the first of a number of tests and any resultant adjustment 503 of the stored value for that word. A check 504 determines whether the last word of the phrase has been tested and, if not, the next untested word is selected at 505 and the procedure reverts to step 502 (first test). If the check of 504 shows that all words of the phrase have been subjected to the first test, the procedure moves to step 506 where the next test is selected from data held in test store 84. Following selection of the first word 507, application of the selected test 508, and the associated adjustment 509 of one or more of the stored values, check 510 determines whether all words of the phrase have been subjected to the particular test. If not, the next is selected at 511 and the procedure reverts to step 508: if so, a further check 512 determines whether all tests have been applied and, if not, the procedure reverts to step 506 (select test).

Returning now to FIG. 4, the procedure continues (once check 512 of FIG. 5 returns positive) with a final pass through the stored values in which half the currently assigned value of a word is added to the value of the succeeding word (404) and any negative values are set to zero (405). At 406, a check is made as to whether there are any existing stored keywords (in keyword store 88) and, if so, before adding the words from the current phrase to the store (407), those already stored are reduced in value to avoid old topics prevailing in keyword search selection. The reduction is accomplished by a first test 408 determining whether the existing stored keywords result from a previous communications session (hence the requirement for keyword store 88 to be in non-volatile memory) or from earlier in the current session. In the former case, the keywords are less likely to be relevant and consequently the stored value for each will be halved at step 409: in the latter case, the value is merely reduced by a value of 1 at step 410.

Having determined values for all words of a current phrase and made appropriate adjustment to the values of any existin stored keywords, those having insufficiently high values to rate as potentially interesting (for example less than 2) are deleted from store 88 at step 411 following which those remaining are ordered in terms of their respective values. From this ordered list, the top word or words (e.g. the first three or the top 30%) are selected at 413 as search terms and passed to the search subsystem 78 which will send them to the search engine (34; FIG. 1) at step 414, process the received results at step 415, and finally display the results, at step 416, alongside the display of exchanged text messages.

The different tests applied in step 402 and their effect on the stored associated values for the words of a phrase are set out in the table of FIG. 6. As previously noted, these tests are only simple examples but have been tried and found to work well.

The first test (PLU) checks for possible plurals by simply identifying those words ending in the letter "s": from an initial value of zero, 1 is added to each identified word. The second test (CAP) identifies those words that begin with a capital letter as being potentially more important and adds 2 to the value of each such word. The third test (VERB) identifies those words ending in the letters "-ed " or "-ing" as possible verb forms and adds 2 to the value of each. The fourth test (QUES) determines whether the phrase may be a question (for example if it begins with "what", "when", "where" etc.): if so, the value of the whole phrase in enhanced and 1 is added to the value of each word in the phrase. The fifth test (JUNK) merely compares the individual words with a stored list of common terms that are not likely to be of interest and subtracts 2 from the value of any matched words. The sixth test (APOS) searches for apostrophes as potentially indicating the subject of the phrase and adds 2 to the value of any such words. The seventh test (INDI) again compares against a stored list, this time of words which may indicate that the following word is the subject of the phrase (for example "the", "in", "on", "a"): for any such 'indicator' words, the stored value is reduced by 2 whilst that of the respective immediately following word is increased by 2. The last test (UNSU) simply identifies those words that have not been classified as common or indicators (fifth and seventh tests) and adds 1 to the value of each.

The table of FIG. 7 shows a simple worked example of the application of the above tests to the phrase "The cat sat on the mat". The first row (INIT) shows the starting (zero) values applied to each word. None of the words end in "s" so the PLU test does not alter any of the values. The CAP test adds 2 to the first occurrence of "the" but has no effect on any other values. There is no result from the following tests VERB, QUES, JUNK ("the" and "on" are assumed excepted from the list as they are potential indicators) and APOS. As shown by the apostrophes, in the INDI test "on" and "the" (both instances) are identified: each has 2 deducted from its value and added to the immediately following word. Next, the UNSU test identifies "cat", "sat", and "mat" and adds 1 to the value of each. The final pass FPASS (steps 404, 405; FIG. 4) sets the negative values to zero and adds to each non-negative word half the value of the preceding word. The last row shows the selection (step 411) of those words having a value of 2 or more, namely "cat", "sat", and "mat" (with "cat" and "mat" preceding "sat" when the words are ordered at step 412). When a subsequent phrase is considered, the value of each of these stored words will be reduced by 1 such that "sat" will be deleted at step 411 unless it occurs again in the newly-considered phrase.

Note that the final values not only determine which words are searched, but also may select a search strategy. From the previous example, if "cat", "sat", and "mat" were all to be searched, the relatively lower value of "sat" may require that it only be searched in combination with a higher value keyword, such as to give a search string of:

(cat) OR (sat AND mat)

Figure 8:
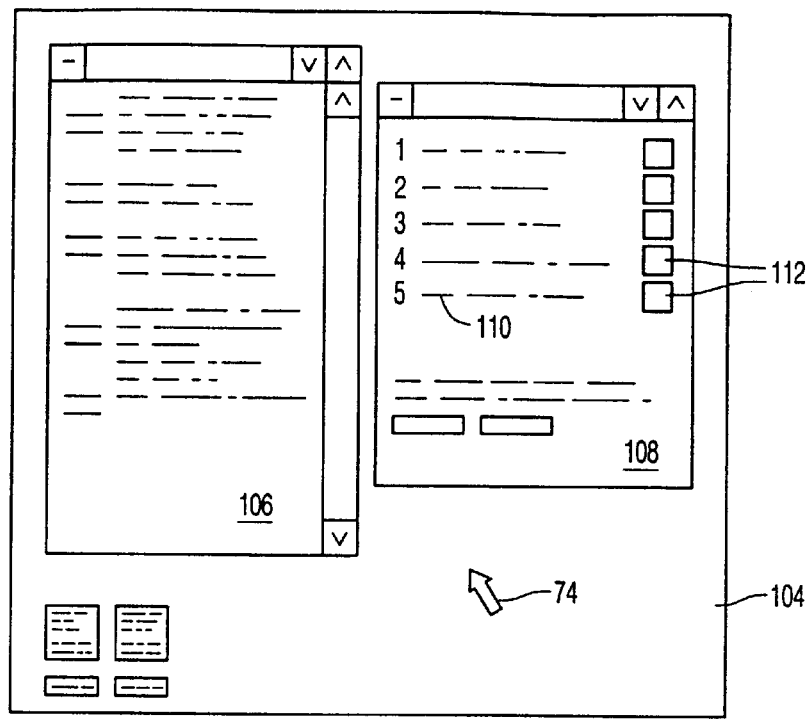
FIGS. 8 and 9 show different possible screen displays that may accompany operation of the system of FIG. 2.
Figure 9:
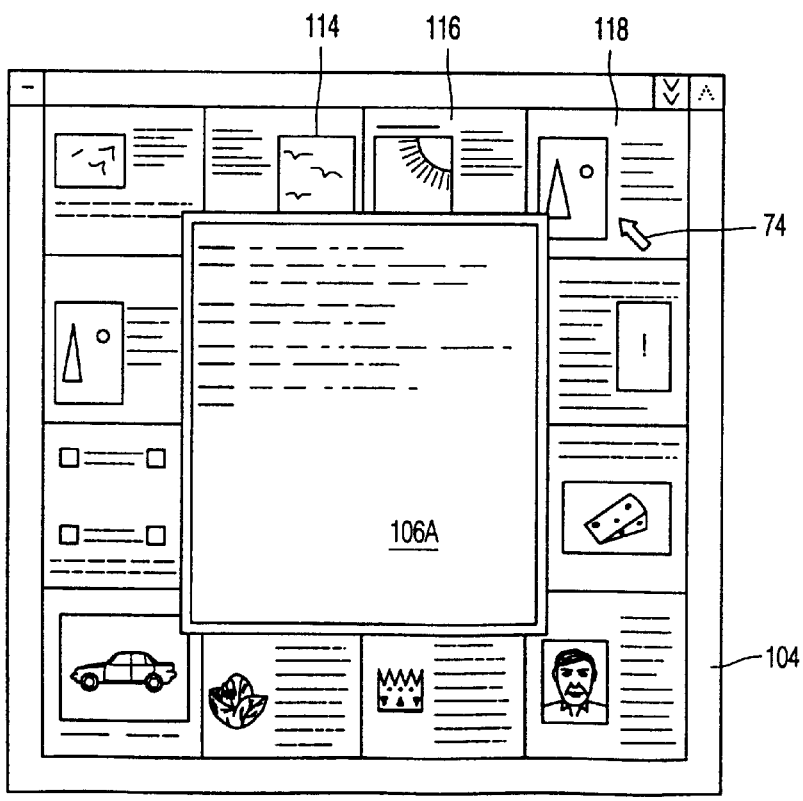

FIGS. 8 and 9 show two possible display formats that may be presented by the display subsystem. The first (FIG. 8) is in the form of a multiple windowed display with the screen area 104 featuring a pair of opened windows 106, 108. The first window 106 carries the most recent exchanges of a web-chat session with another user. The other window 108 is periodically updated to carry links in the form of URL's for the five most relevant search results as determined either by the search engine 34 or search subsystem 78. The remote sites indicated by the listed results may simply be accessed by cursor selection of either the recited identifier 110 (where a HTML link) or an adjacent icon 112. Suitably, the selection results in display from the selected site in a window (not shown) which either abuts or only partially overlaps the window 106 in which the ongoing web-chat is displayed.

The alternative display format shown in FIG. 9 again features an area 106A for display of web-chat. In this case it is surrounded by reduced scale still images 114, 116, 118 downloaded from the sites identified by the search subsection. Cursor 74 selection of one of these images will cause it to be zoomed up (again without fully obscuring the text area 106A) and the on-line link to the particular site reestablished. By presenting and updating the images around the periphery of the screen in the order in which they were first accessed, the border provides a visual recent history of the web-chat topics of conversation which, if downloaded en masse to a newly logged-on user, may provide a useful introduction.

Figure 10:
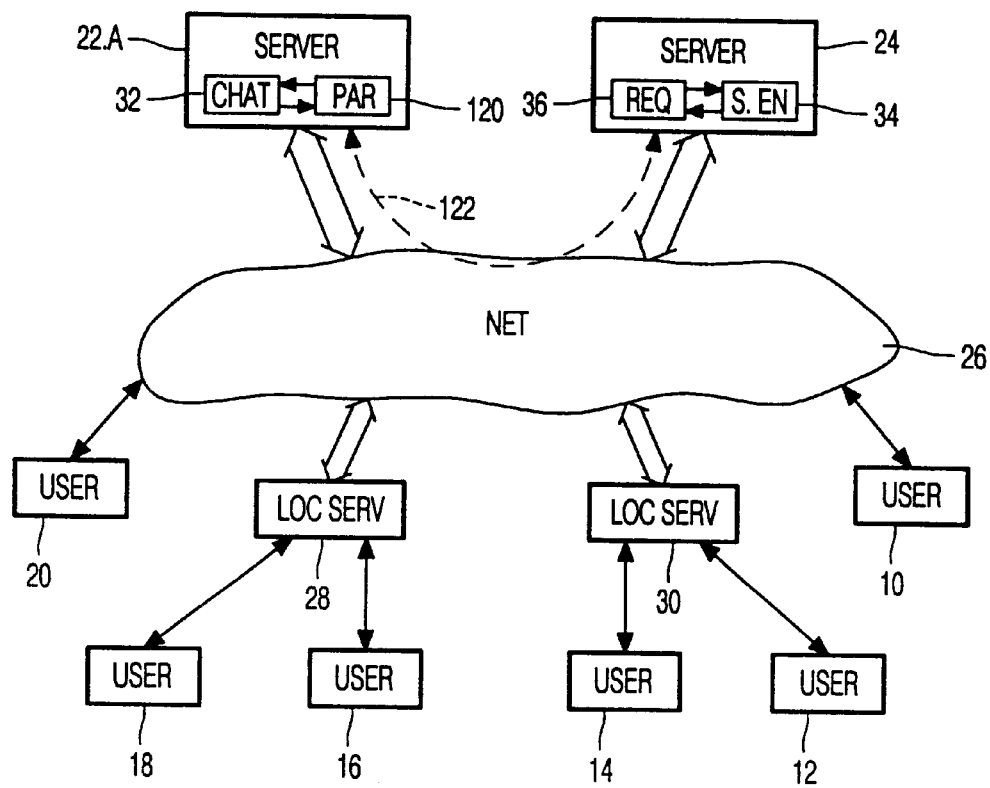
FIG. 10 is a block schematic diagram of an alternative arrangement of network communication system embodying the invention.

From reading the present disclosure, other modifications will be apparent to persons skilled in the art. Such modifications, whilst remaining within the scope of the following claims, may involve other features which are already known in the design, manufacture and use of data transmission and presentation systems, display apparatuses and component parts thereof and which may be used instead of or in addition to features already described herein. Some of these modifications or variations are illustrated in FIG. 10, the features of which otherwise correspond to FIG. 1, and for which the same reference numerals have been used, which features will not be again described. In this embodiment, the parser subsystems 38, 40 of FIG. 1 are absent from the user systems 10, 12. Instead, the server 22A hosting the chat space 32 also hosts an associated parser subsystem 120 which performs the previously described procedures for keyword identification and access to a remote search engine 34 (as shown by dashed line 122) on all chat space messages. The parser subsystem 120 may be a single entity handling all received text messages as successive phrases to be parsed, and transmitting the selected search data to all currently logged-on users. Alternately, the subsystem 120 may comprise an array of parsers with respective ones being assigned to each user logged-on and subsequently parsing the messages of, and reporting back to, just that user.

Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same the technical problems as does the present invention. The applicants hereby give notice that new claims may be formulated to such features and/or combinations of features during the prosecution of the present application or of any further application derived therefrom.

What is claimed is:

1. A message parsing apparatus for use in a network communications system, said apparatus comprising:
   an input to receive text messages sent between users of the network communications system;
   a parser subsystem coupled to receive said text messages, and including processing means arranged to process said received text messages in accordance with a predetermined processing strategy to identify one or more keywords therein; and
   a search subsystem coupled with said parser subsystem and arranged
      to receive said identified one or more keywords,
      to selectively transmit one or more such keywords via the network communications system to a search engine coupled with the network communications system, to obtain links to additional information pertaining to the one or more keywords,
      to receive information regarding the links from the search engine, and
      to output the information regarding the links to at least one of said users of the network communications system.

2. A message parsing apparatus as claimed in claim 1, wherein
   said parser subsystem further comprises
      a first memory into which the words of a received text message are loaded, each with a respective initial value which values are subsequently modified during processing by said processing means,
      the parser subsystem further being configured, at the conclusion of processing, to identify those stored words having an associated value exceeding a predetermined threshold and output said words as keywords to said search subsystem.

3. A message parsing apparatus as claimed in claim 2, wherein
   said parser subsystem is arranged to accumulate in said storage device keywords from successive messages.

4. A message parsing apparatus as claimed in claim 3, wherein
   said parser subsystem is arranged to reduce the associated value of all stored keywords prior to identifying keywords and their respective associated values in a newly received message.

5. A message parsing apparatus as claimed in claim 4, wherein
   the first memory is a non-volatile storage device and,
   at the start of a message communication session, the associated values for any stored keywords from a previous session are halved.

6. A message parsing apparatus as claimed in claim 2, wherein
   said search subsystem is configured to select, for transmission to said search engine, those stored keywords meeting a selection criteria including at least partially the respective associated values.

7. A message parsing apparatus as claimed in claim 2, further comprising
   user feedback means coupled to supply a feedback signal to said parser subsystem indicative of user response to the information regarding the links, said parser subsystem being configured to adjust the stored keyword associated values in dependence on said feedback signal.

8. A data network browser comprising:

a message parsing apparatus for use in a network communications system, said message parsing apparatus comprising:

an input to receive text messages sent between users of the network communications system;

a parser subsystem coupled to receive said text messages, and including processing means arranged to process said received text messages in accordance with a predetermined processing strategy to identify one or more keywords therein; and a search subsystem coupled with said parser subsystem and arranged to receive said identified one or more keywords, to selectively transmit one or more such keywords via the network communications system to a search engine coupled with the network communications system, to receive links to additional information pertaining to the one or more keywords from the search engine, and to output information corresponding to the links to at least one of said users of the network communications system, an interfacing means to the network communications system, user operable message input means coupled with said input to receive text messages, and a display subsystem coupled with said parser and search subsystems and arranged to generate a display image including at least one of one or more text messages, and one or more indicators of the information corresponding to the links.

9. A data network browser as claimed in claim 8, wherein the display subsystem is further operable to display text messages received via said interfacing means from said users of the network communications system.

10. A data network browser as claimed in claim 9, further comprising user operable switch means in response to the setting of which said parser subsystem will identify, and output to the search subsystem, keywords from at least one of messages input by the user of the browser and messages received via the interfacing means.

11. A data network browser as claimed in claim 8, wherein the display subsystem is configured to display said indicators of the links from the search engine as user selectable screen icons, a selection of which causes the search subsystem to access, via the network communications system, a remote data source as identified by the link corresponding to the selection.

12. A data network browser as claimed in claim 8, wherein the display subsystem is configured to display said indicators of the information regarding the links from the search engine as partial screen images downloaded by the search subsystem, via the network communications system, from a remote data source as identified to said search subsystem by the links.

13. A data network browser as claimed in claim 8, further comprising audio message input means, coupled via a speech-to-text converter subsystem to said input to receive text messages, and providing a user with alternate message input means.

14. A network server configured as a chat space service provider in a network communications system, said server comprising:

a message parsing apparatus for use in the network communications system, said message parsing apparatus comprising:

an input to receive text messages sent between users of the network communications system;

a parser subsystem coupled to receive said text messages, and including processing means arranged to process said received text messages in accordance with a predetermined processing strategy to identify one or more keywords therein; and a search subsystem coupled with said parser subsystem and arranged to receive said identified one or more keywords, to selectively transmit one or more such keywords via the network communications system to a search engine coupled with the network communications system, to obtain links to additional information pertaining to the one or more keywords, to receive information regarding the links from the search engine, and to output the information regarding the links to at least one of said users of the network communications system, and an interface coupled to receive text messages sent between said users of the network communication system, the message parsing apparatus being further configured to include corresponding received results from said search engine with text messages sent between said users of the communications device.

15. A network server as claimed in claim 14, wherein said message parsing apparatus is further configured to transmit said corresponding received results to a user originating a text message.

* * * * *